C. H. MANNING.
Tan-Vats.

No. 163,021.

2 Sheets--Sheet 1.

Patented May 11, 1875.

Witnesses:
Inventor:

THE GRAPHIC CO.PHOTO-LITH.39 & 41 PARK PLACE,N.Y.

2 Sheets--Sheet 2.

C. H. MANNING.
Tan-Vats.

No. 163,021.

Patented May 11, 1875.

Witnesses:

Inventor:

UNITED STATES PATENT OFFICE.

CHARLES H. MANNING, OF WASHINGTON, DISTRICT OF COLUMBIA.

IMPROVEMENT IN TAN-VATS.

Specification forming part of Letters Patent No. 163,021, dated May 11, 1875; application filed May 25, 1874.

*To all whom it may concern:*

Be it known that I, CHARLES H. MANNING, of Washington, in the county of Washington and District of Columbia, have invented certain Improvements in Vats for Tanning Leather *in vacuo* and under pressure; and I do hereby declare that the following is a full and exact description thereof, reference being had to the accompanying drawing making part of this specification, in which—

Figure 1:
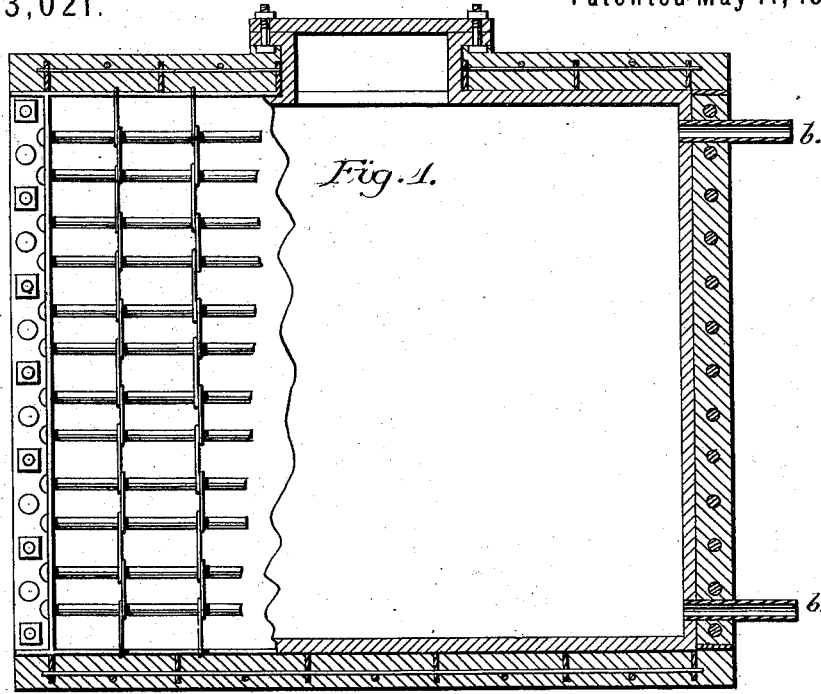
Figure 2:
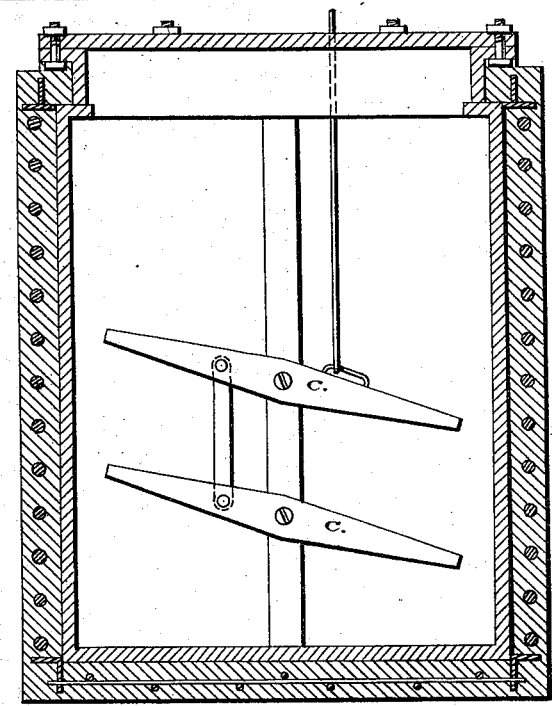
Figure 3:
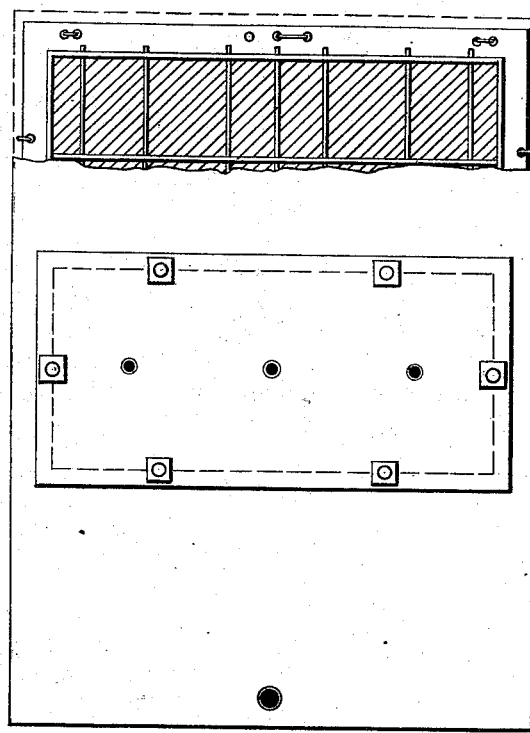
Figure 4:
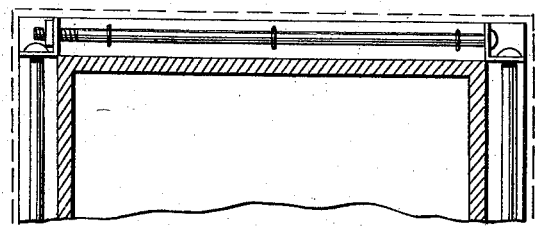

Figure 1 is a longitudinal section; Fig. 2, a transverse section. Fig. 3 is a plan or top view. Fig. 4 is a partial horizontal section, showing the construction, &c.

My improved vat is especially intended to be used with the vacuum and pressure processes of tanning, but may be employed as a refrigerator, or for other analogous purposes.

The main feature of this invention consists in the construction of a frame of iron over a wooden box or vat, on both of which the cement is laid, and entirely covered, except the iron cover rim.

The method of construction is as follows: I make a wooden vat, of any size desired, the smaller of inch boards, and the larger thicker in proportion, tongued and grooved, with their edges left slightly open when nailed to the corner-posts, to allow for swelling when filled with tan-liquor. The top of the vat is to be covered only one-third of the distance from each end. For the iron frame I have corner-posts and bottom rails cast or wrought the lengths desired, and, say, half an inch thick, and two inches wide each way at right angles, with holes to receive the iron rods, which may be about half an inch in diameter, the rods to be made with heads on one end, and screws and nuts on the other. A top frame is also fitted for iron rods like the sides, and to receive the cover-rim, for which I make an iron dome to extend the width of the vat, and leave a third or so open for the iron cover, thus making an iron frame, which may be interlaced with wire over a wooden box, on and over all of which the cement is laid.

The cover is to be made air-tight, with rubber gaskets, and fastened on to resist the pressure applied. A like aperture and cover for the side of the vat can be made if desired. Tubes *a a* for air-pump and pressure gage in the cover-pipes *b b*, to let in and out the liquor, are placed in the vat while building. Agitators *c c*, (patented in a previous vat,) for stirring the liquor within, are mounted inside to be operated by a connecting-rod working through the top.

What I claim as my invention is—

A wooden vat or cistern, supported, as shown, by a metallic frame net-work, the whole incased with a covering of artificial stone or cement, as shown and described.

CHAS. H. MANNING.

Witnesses:
WM. H. MINNIX,
BEN. M. PLUMB,
D. A. BABCOCK.